Patented Apr. 8, 1947

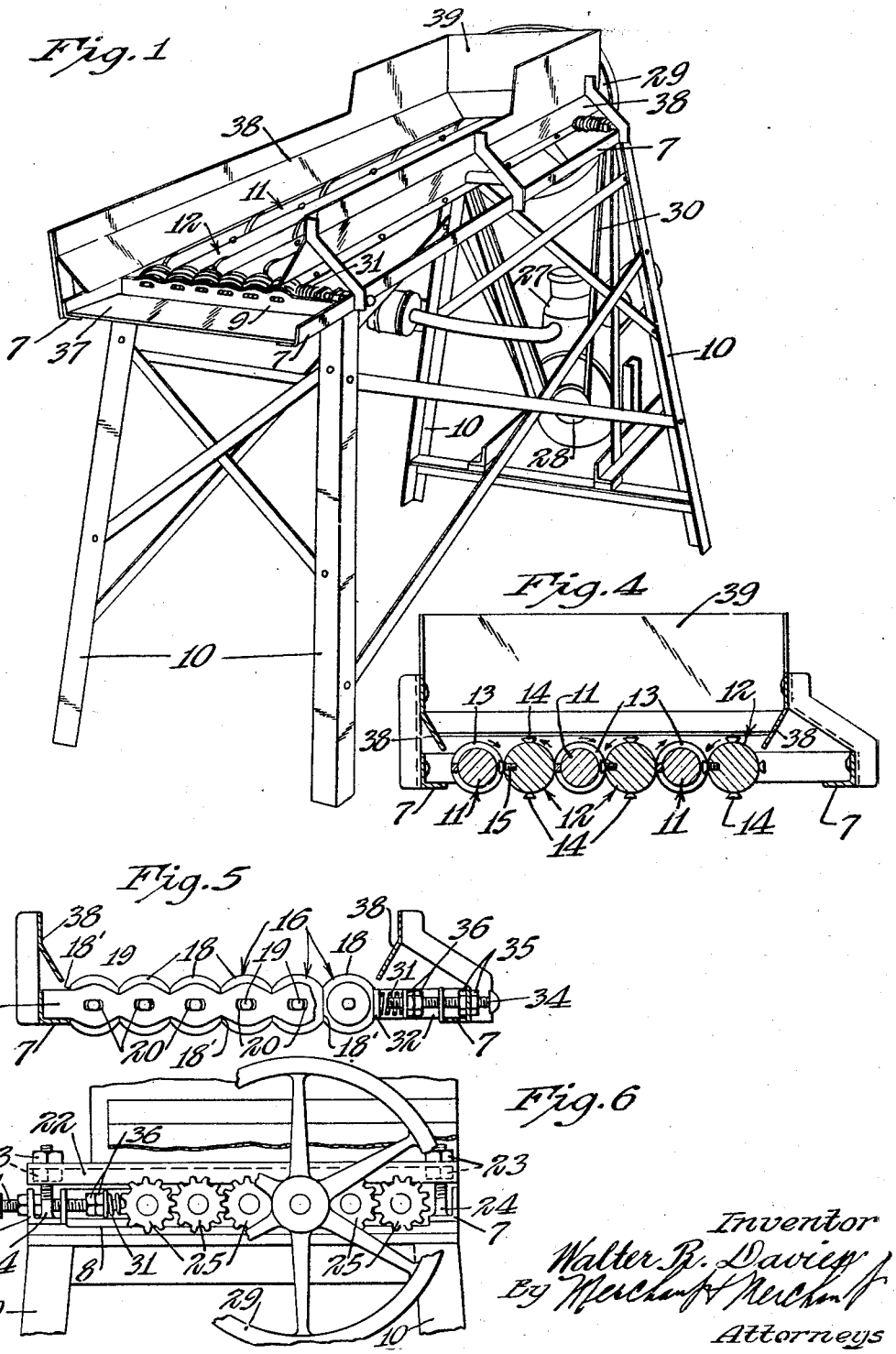

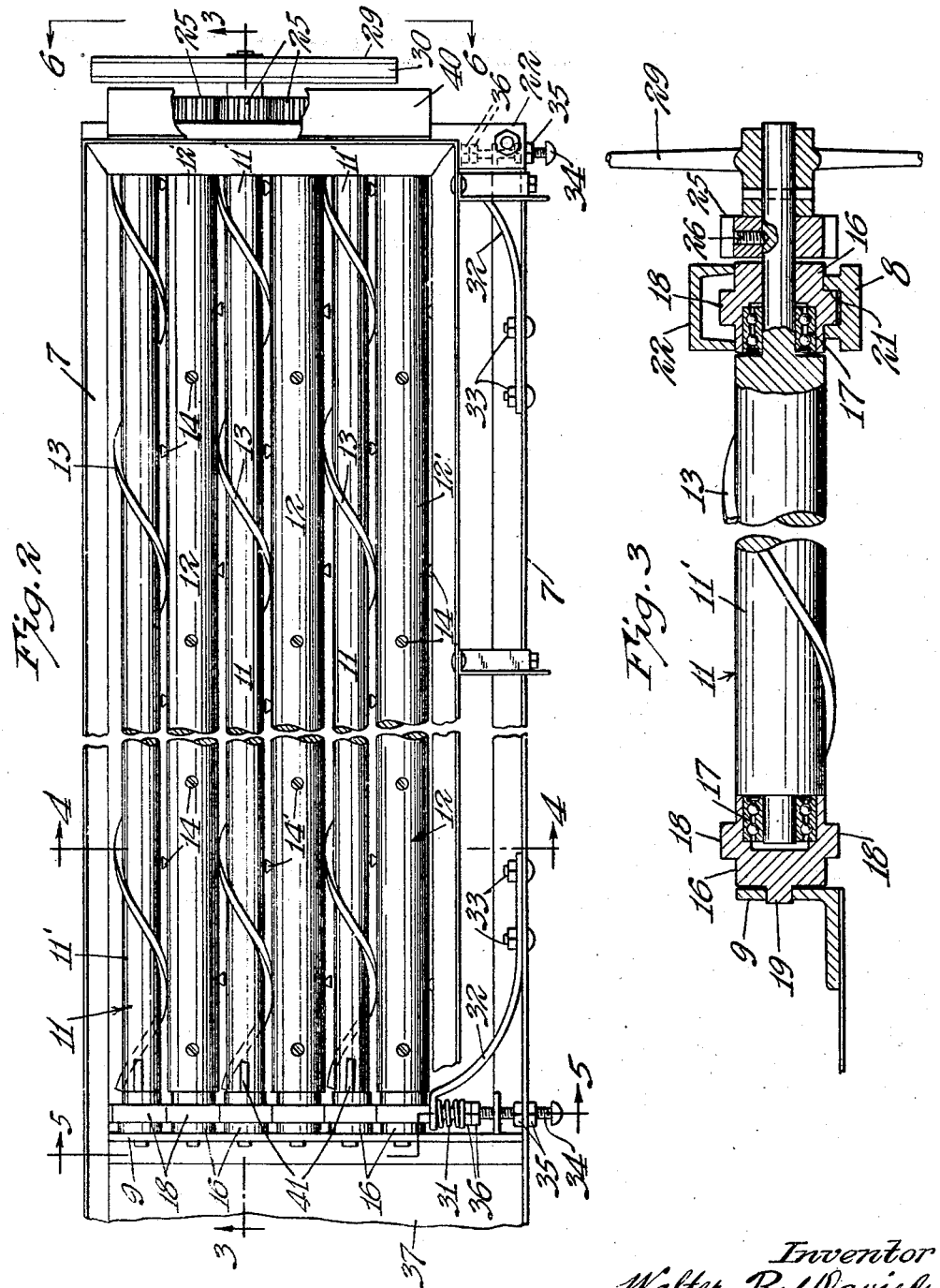

2,418,700

UNITED STATES PATENT OFFICE 2,418,700

CORNHUSKING MACHINE

Walter R. Davies, Shakopee, Minn., assignor to Northrup, King & Co., Minneapolis, Minn., a corporation of Minnesota Application July 5, 1943, Serial No. 493,533

2 Claims. (Cl. 130—5)

My present invention relates to a machine having as its primary purpose the husking of corn, but which has been found highly effective as a machine for thrashing squash and pumpkins to remove the seeds therefrom for future planting.

The machine of the present invention incorporates a plurality of elongated parallel roller elements that are power rotated and which form a sort of grid over which corn cobs or relatively large pieces of squash, pumpkin, or the like, are adapted to travel longitudinally and through which corn husks, loose kernels of corn, and the seeds of squash, pumpkin, and the like, are adapted to pass. These elongated roller elements are provided at their peripheries with means for gripping and tearing loose the husk and silk from cobs of corn and discharging the same downwardly between the roller elements, and for gripping and tearing loose from pieces of diced squash, pumpkin, or the like, the pithy or fibrous portion and seeds and discharging the same downwardly between the rollers.

In the preferred embodiment of the invention illustrated feeding of material longitudinally of the roller elements is accomplished by tipping the roller elements longitudinally and utilizing gravity as a motivating force. Also in the preferred embodiment of the invention illustrated certain of the roller elements are provided at their peripheries with spiral vanes which run substantially in contact with the adjacent roller elements and serve, in conjunction with the adjacent roller elements, to grip and downwardly feed corn husks or the fibrous portions and seeds of diced vegetables such as squash and pumpkin. Adjacent rollers of the preferred embodiment of the invention illustrated are driven at like speeds but in opposite directions producing downward feeding movement between the roller elements, and the roller elements adjacent the spiral vane-equipped roller elements are provided with spaced projections, hereinafter referred to as husking pins, which are laid out along a spiral course having the same pitch as the spiral vanes but which spiral course winds around its rollers in a direction opposite to that of the spiral vanes.

The above and numerous other important objects, advantages and features of the invention will be made apparent from the following specification, claims and appended drawings. In the accompanying drawings like characters indicate like parts throughout the several views.

Referring to the drawings:

Fig. 1 is a rear perspective view of a machine embodying the invention;

Fig. 2 is an enlarged plan view with some parts broken away of the machine shown in Fig. 1;

Fig. 3 is a still further enlarged detail view with some parts broken away and some parts on the section line shown in full, taken on the line 3—3 of Fig. 2;

Fig. 4 is a transverse sectional view taken on the line 4—4 of Fig. 2;

Fig. 5 is a transverse sectional view taken on the line 5—5 of Fig. 2; and

Fig. 6 is a fragmentary front end view of the machine with some parts broken away, taken on the line 6—6 of Fig. 2.

The main frame of the machine illustrated is a rectangular affair composed of laterally spaced parallel angle iron side members 7, a front cross member 8 and a rear cross member 9. This rectangular frame structure is longitudinally inclined from front to rear and is supported by trussed legs 10. The roller elements of the invention are disposed within the rectangular frame and extend longitudinally of the laterally spaced frame side members 7.

The spiral vane-equipped roller elements are indicated as entireties by 11 and, in accordance with the preferred embodiment of the invention being described, every second roller is a vane-equipped roller 11. The intermediate rollers, which cooperate with the spiral vane-equipped rollers, are indicated as entireties by 12. Preferably, and as illustrated, the roller elements 11 and 12 have cylindrical main bodies 11' and 12' respectively. The spiral vanes on the roller elements 11 are indicated by 13 and these are formed by winding cross sectionally square strips of steel about the cylindrical bodies 11' and welding the same in place on said bodies. The peripheries of these spiral vanes 13 run substantially in contact with the cylindrical peripheries of the bodies 12' of the adjacent roller elements 12. The spaced projections of the roller elements 12 (otherwise referred to as husking pegs or pins) are indicated by 14, and in the preferred embodiment of the invention illustrated, these are formed by the flared sharp edged heads of screws 15, see particularly Fig. 4.

The roller elements 11 and 12 are reduced in diameter at their opposite ends and are journalled in lateral floating bearing elements 16 through the medium of ball-type anti-friction bearings 17. The several floating bearing elements 16 are provided with peripheral flanges 18 having diametrically opposed flat sides 18'. In the structure illustrated the peripheral flange-equipped bearing elements 16 serve as spacers for the rollers 11 and 12, and by reference particularly to Fig. 5 it will be seen that the bearing elements 16 of adjacent rollers 11 and 12 have the flat sides 18' of their peripheral flanges 18 in engagement to establish minimum spacing of the rollers independently of peripheral engagement between roller elements 11 and 12. As previously stated, the peripheries of the spiral vanes 13 of roller elements 12 work substantially in engagement with the adjacent rollers 12, but it should be understood that it is desirable to prevent frictional wear between the spiral vanes 13 and adjacent rollers, and for this purpose the flanges 18 of bearing elements 16 come into engagement in time to relieve the spiral vanes of actual pressure of the adjacent rollers. In other words, it is desirable to maintain slight clearance between the spiral vanes and adjacent rollers, but the less clearance the better for the purpose and a fraction of one thousandths of an inch is sufficient.

The bearing elements 16 at the rear ends of the rollers 11 and 12 are formed, in line with the axis of the rollers, with projecting studs 19 having diametrically opposed flat surfaces and which studs 19 work in slots 20 in the rear frame cross member 9. In this manner the rear bearing elements 16 are held firmly against vertical movement but are free for limited lateral movement one in respect to the other. The front bearing elements 16 all rest on the front frame cross member 8, which latter has (see Fig. 3) a transverse upwardly opening channel 21 in which the bottoms of the peripheral flanges 18 of the front bearing elements are received. In the structure illustrated upward vertical movement of the front ends of the roller elements 11 and 12 is prevented by a transverse retaining bar 22 of channel shape cross section which overlies the front frame cross member 8 and engages the upper surfaces of the front bearing elements 16, see particularly Figs. 3 and 6. This channel shaped retaining bar 22 is anchored between opposed nuts 23 on the upper ends of studs 24 that are rigidly anchored to and project upwardly from the frame side members 7. The frame cross member 8 and retaining bar 22 provide a guideway between them in which the front bearing elements 16 are free for lateral movements but are firmly held against vertical movements.

The reduced diameter shaft-forming front end portions of the roller elements 11 and 12 project forwardly through the front bearing elements 16 and are each equipped with a spur gear 25 held fast thereon by suitable set screws, or the like, 26. The several gears 25 intermesh to provide a gear train and this gear train is driven from a suitable source of power such as a conventional internal combustion engine 27, shown in Fig. 1, and which is suitably mounted at the front of the machine. The engine is equipped with a power driven pulley 28 and connection therebetween and the gear train described is provided by means of said pulley 28, a large speed reducing pulley 29 on the projected end of one of the reduced diameter shaft-forming portions of one of the spiral vane-equipped roller elements 11 and a belt 30 running over said pulleys 28 and 29.

The several roller elements 11 and 12 are all yieldingly pressed toward one another to the maximum extent permitted by engagement of their respective bearing elements 16 by coiled biasing springs 31 and cooperating leaf biasing springs 32. The leaf biasing springs 32 are anchored to one of the side frame elements 7 at 33 and have their free ends one in engagement with the peripheral flange of an outside front bearing element 16 and the other in engagement with the peripheral flange 18 of an outside rear bearing element 16. The coiled compression type biasing springs 31 are mounted on stop bolts 34 that project through one of the frame side members 7 and are locked in place thereon by opposed lock nuts 35. The free ends of the stop bolts 34 are adjusted to be spaced from the free ends of the leaf springs 32 just sufficiently to limit spacing between any cooperating pair of roller elements 11 and 12 to slightly less than what is required to bring the cooperating gears 25 of said rollers out of mesh. In other words, these stops will prevent accidental unmeshing of any cooperating pair of gears 25 which is a necessary precaution in order to maintain a definite timed relation between the rollers 11 and 12.

Tension of the compression springs 31 is determined by nuts 36 on the stop bolts 34 and against which the outer ends of the springs 31 react. It will be noted particularly by reference to Figs. 5 and 6 that the bearing elements 16 at the extreme side of the machine opposite the biasing springs 31 and 32 have their peripheral flanges 18 in engagement with a frame side member 7 and are thereby limited against lateral movement in that direction under the action of the biasing springs 31 and 32.

Preferably the rear ends of the laterally spaced frame members 7 are projected rearwardly beyond the cross member 9 and support an apron-forming plate 37. Preferably also the sides and front of the machine are built up by side baffle plates 38 and a front end baffle plate 39 to provide a sort of hopper for maintaining material within the space above the several roller elements 11 and 12, these baffle plates 38 and 39 being supported mainly from the laterally spaced frame side member 7. The rear baffle plate 39, it will be noted particularly by reference to Fig. 2, is provided with a forwardly projecting guard plate 40 overlying the train of gears 25.

In the preferred embodiment of the invention illustrated all of the spiral vane-equipped roller elements 11 are driven in a clockwise direction with respect to Figs. 1, 2, 4 and 5 and all of the peg-equipped roller elements 12 are driven in a counterclockwise direction in respect to said figures, so that downward feeding action is produced between each spiral vane-equipped roller 11 and an adjacent peg-equipped roller element 12.

While I do not wish to limit myself to any specific dimensions or measurements, I believe it would expediate the efforts of anyone attempting to reproduce the machine from the present disclosure to be appraised of certain specifications which have been proven successful in commercial devices and, therefore, offer the following specifications representative of those most successfully used to this date.

In the commercial machine from which these drawings were made, the roller elements 11 and 12 are 5 feet in length. The cylindrical bodies 11' of the roller elements 11 are 2 inches in diameter and the spiral vanes 13 of said roller elements 11 are formed of stock ¼" by ¼" square, thereby bringing the over-all diameter of the roller elements 11 up to 2½ inches. The cylindrical bodies 12' of the roller elements 12 are 2½ inches in diameter, or in other words, of a diameter equal to the over-all diameter of the spiral vane-equipped roller elements 11. The spiral vanes 13 are continuous and unbroken from one end of the roller elements to the other and have a pitch equal to one full convolution to the linear foot measured axially of the roller elements 11. These spiral vanes are wound clockwise about their respective cylindrical bodies 11'. The husking pegs or pins 14 of the roller elements 12 are laid out on a spiral course also having one convolution to the foot measured axially of the roller element but which spiral courses extend in a counter-clockwise direction about their respective roller elements 12, and, of course, the pins are so spaced on their spiral courses that they will clear the spiral vanes of adjacent roller elements.

It should be definitely understood that the detailed specifications and measurements given in the last paragraph above are given for the convenience of anyone attempting to utilize the invention and not for the purpose of in any way limiting the claims in this application.

For a purpose that will be made clear from the following operation, the roller elements 11 are provided, adjacent their rear end portions, with short longitudinally extended and radially projecting shearing blades 41 which are preferably about 2 inches long and of approximately the same cross section as the vanes 13 so that they will substantially contact the cooperating roller elements.

*Operation*

In the husking of corn the ears of corn, complete with their husks, are dumped on to the front end portions of the roller elements 11 and 12 while the same are revolving in the manner described. Due to the forward inclination of the rollers, the ears will tend to gravitate from front to rear of the machine, but in the course of their movement, the husks thereof will be gripped by the revolving husking pins 14 and will be pulled downwardly thereby between a cooperating pair of roller elements 11 and 12 where they will be caught between a revolving vane 13 and the periphery of a cooperating roller 12 and be pulled loose from the cob and dropped to the ground or receptacle beneath the rollers.

Of course, the whole husk will not be removed at one time but rather will be removed in fragments or sections. The ears of corn will tend to become disposed longitudinally of the rollers and will be continuously revolved on their own axis so that all portions of the husk will be drawn between adjacent rollers at some time during the course of travel of the ear from front to rear of the machine under the action of gravity. Of course, when portions of the husk get between the periphery of a spiral vane 13 and the periphery of an adjacent roller, the roller elements 11 and 12 will be forced to part against the action of the biasing springs to permit the downward passage of the husk.

Finally the husked ears of corn are discharged over the rear ends of the rollers 11 and 12 by gravity on to the apron 37 from which they will be discharged into a suitable receptacle, conveyor, or the like.

In practice it has been found that short, stubby ends of the husk remaining on one end of the ear of corn are apt to prevent free discharge of the husked ears off of the rear ends of the roller elements, and it is for this purpose that I preferably provide the shearing blades 41. These shearing blades 41 cooperate with the adjacent roller elements 12 to shear off such remaining stub portions of the husk which tend to retard feeding action of the ear.

The machine described has been tried and found highly efficient for use in husking all varieties of corn including fancy seed corn, field corn and popcorn, and with very little damage to the kernals of corn on the cobs. While a kernel of corn is occasionally displaced from the cob during the husking process, such kernals usually pass freely between the rollers without damage and may be collected for seed or feed purposes.

In the thrashing of squash or pumpkin the mealy bodies thereof are diced and placed upon the rollers, just as in the case of ears of corn, complete with their attached pithy or fibrous interior substance and seeds. During the course of travel of these diced pieces of squash or pumpkin over the roller elements 11 and 12, the fibrous or pithy substance and seeds will be pulled loose from the mealy bodies and discharged downwardly between the rollers, whereas the mealy bodies will be discharged just as husked ears of corn. To obtain the seed all that is necessary now is to separate the same from the pithy or fibrous substance and, of course, the diced mealy portions of the pumpkin or squash may be saved for food purposes.

What I claim is:

1. In a corn husking machine, a frame, a pair of elongated roller elements journalled to the frame in laterally spaced parallel relation, the periphery of one of said roller elements being provided with a spiral vane extending substantially from end to end thereof, the periphery of said spiral vane being substantially in contact with the periphery of the adjacent roller element, mechanism for imparting like speed opposite rotation to the adjacent rollers in directions producing downward movement therebetween, spaced projections on the other of said rollers positioned to work between the adjacent rollers and out of contact with the spiral vane of the other roller, and one of said pair of roller elements being provided adjacent the end thereof at the out-feed end of the machine with a longitudinally extended shearing blade that runs substantially in contact with the adjacent roller element, whereby to shear off the stub end portions of husks which tend to retard longitudinal feeding movements of a corn ear at the out-feed end of the machine.

2. In a corn husking machine, a table-like structure having a pair of parallel elongated rollers supported in the upper surface which is slightly inclined to the horizontal in the provision of an upper feed-in end and a lower feed-out end, gear means for rotating said rollers in directions toward each other, a spirally arranged projection on one of said rollers extending substantially from the upper to the lower end thereof, spaced projections extending from the other roller and arranged to work between the rollers and out of contact with the spirally arranged projection and operative to remove the husks from the corn ears and draw them between the rollers for discharge therebeneath, and a relatively short longitudinally extending shearing blade adjacent the lower end of the spiral projection carrying roller in substantial contact with the adjacent roller for shearing off the stub end portions of husks which tend to retard discharge of the corn ears at the lower ends of the rollers.

WALTER R. DAVIES.

REFERENCES CITED

The following references are of record in the file of this patent:

UNITED STATES PATENTS

| Number | Name | Date |
|---|---|---|
| 1,413,617 | Romans | Apr. 25, 1922 |
| 902,729 | Hibbs | Nov. 3, 1908 |
| 406,090 | Collis | July 2, 1889 |
| 750,426 | Billings | Jan. 26, 1904 |
| 765,233 | Ferris | July 19, 1904 |
| 1,431,985 | Scheman et al. | Oct. 17, 1922 |
| 786,460 | Paige | Apr. 4, 1905 |
| 546,390 | Rosenthal | Sept. 17, 1895 |
| 856,931 | White | June 11, 1907 |
| 788,831 | Hollandletz | May 2, 1919 |
| 1,314,353 | Morral | Aug. 26, 1919 |
| 559,548 | Swart | May 5, 1896 |
| 1,226,718 | Stone | May 22, 1917 |
| 1,827,216 | Synck | Oct. 13, 1931 |
| 2,315,950 | Fitzloff | Apr. 6, 1943 |
| 882,466 | Harman et al. | Mar. 17, 1908 |
| 619,231 | Rupp | Feb. 7, 1899 |